United States Patent
Hess

(10) Patent No.: US 7,848,123 B2
(45) Date of Patent: Dec. 7, 2010

(54) CURRENT CONTROLLED SHUNT REGULATOR

(75) Inventor: Gary L. Hess, Enfield, CT (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/348,611

(22) Filed: Jan. 5, 2009

(65) Prior Publication Data

US 2010/0172165 A1 Jul. 8, 2010

(51) Int. Cl.
*H02H 7/00* (2006.01)
(52) U.S. Cl. .............. 363/52; 322/28; 361/56
(58) Field of Classification Search .......... 363/52, 363/53, 77, 81, 84, 125, 127, 144, 145; 318/244, 318/400.01, 400.06, 400.26, 400.27, 400.28, 318/441, 504, 599, 672, 800, 803, 811, 812; 322/7, 23, 24, 28; 361/20, 21, 54, 56
See application file for complete search history.

(56) References Cited

U.S. PATENT DOCUMENTS

| | | | |
|---|---|---|---|
| 4,363,068 A | 12/1982 | Burns | |
| 4,547,828 A * | 10/1985 | Bloomer | ............... 361/86 |
| 4,833,337 A | 5/1989 | Kelley et al. | |
| 4,835,454 A | 5/1989 | White | |
| 5,289,361 A | 2/1994 | Vinciarelli | |
| 6,697,245 B2 | 2/2004 | Andrews | |
| 6,768,350 B1 | 7/2004 | Dickey | |
| 6,775,112 B1 | 8/2004 | Smith et al. | |
| 6,912,142 B2 * | 6/2005 | Keim et al. | ............... 363/89 |
| 7,221,195 B2 | 5/2007 | Bhalla et al. | |
| 7,378,884 B2 | 5/2008 | Bhalla et al. | |
| 7,411,471 B2 | 8/2008 | Tsukahara | |
| 2003/0095423 A1 | 5/2003 | Hirst | |
| 2007/0052397 A1 | 3/2007 | Thompson et al. | |

FOREIGN PATENT DOCUMENTS

GB 2 301 240 A 11/1996

OTHER PUBLICATIONS

European Search Report for EP Application No. 09252891.8, Apr. 26, 2010.
Reddig, Prof. Dr. Manfred, "Optimization of the Input and Output Stages in High Efficiency Power Supplies," Industrial Technology, 2003, IEEE International Conference on Maribor, Slovenia, Dec. 10, 2003, vol. 2, pp. 1190-1195, XP010699161.

* cited by examiner

*Primary Examiner*—Gary L Laxton
*Assistant Examiner*—Nusrat J Quddus
(74) *Attorney, Agent, or Firm*—Carlson, Gaskey & Olds, P.C.

(57) ABSTRACT

A current controlled shunt regulator uses logical OR gates and comparators corresponding to each field effect transistor (FET) shunt to redirect power to a neutral line whenever a controller indicates that power should be redirected, or whenever a phase voltage connected to the FET shunt is negative. The logical OR gate accepts inputs from the comparator and from the controller and outputs a control signal based on these inputs. When power is not being redirected by the FET shunts, AC power from a permanent magnet alternator is allowed to flow unimpeded to a DC rectifier which converts the power to a different format.

19 Claims, 1 Drawing Sheet

CURRENT CONTROLLED SHUNT REGULATOR

BACKGROUND OF THE INVENTION

The present application is directed toward the field of power rectification and specifically toward a field effect transistor (FET) shunt regulator for use with a permanent magnet alternator (PMA).

Machines for creating multiphase alternating current (AC) electrical power are well known in the art, as are methods for converting the AC electrical power into direct current (DC) electrical power for use with applications requiring DC power. Often when converting from AC to DC, a higher DC voltage is generated than can be handled by the DC load. When this occurs a shunt regulator is used to reduce the power seen by the load.

A shunt regulator operates by "shunting" a portion of the AC current to a neutral line. This short circuits out the rectifier portion during a portion of the period of the AC current. A typical shunt regulator will alternate between shunting and not shunting at a high enough frequency that a response time of a DC rectifier renders an approximately constant DC output power at the desired level.

One standard shunt regulator design utilized in the art is an FET shunt. An FET shunt uses FET's to create a short circuit from a phase voltage line connected to the source node of the FET to a neutral line connected to the drain node of the FET. The short circuit is created when the FET is turned on via a control signal thereby connecting the source and drain nodes in a virtually unimpeded manner.

When an FET shunt such as the one described above is utilized with a PMA there is necessarily a return current that must return to the PMA in order to form a complete circuit. While the FET shunt is on (aka shunting) the connection between the source and drain provides unimpeded access across the FET for return current from the neutral line. However, when the FET shunt is off there is no connection between the source and drain and the current must return through a different path. In a typical design in the art the current will return across a body-drain connection in the FET. The connection is referred to as a body-drain diode. The body-drain diode connection acts in a similar manner as a diode and typically has a voltage drop of around 1.4V across it. This voltage drop causes power dissipation within the FET resulting in a lower efficiency for the shunt regulator as well as reducing the lifespan of the FET itself.

SUMMARY OF THE INVENTION

Disclosed is a shunt regulator for a multiphase permanent magnet alternator (PMA). The shunt regulator has a rectifier capable of converting AC power from the multiphase PMA into DC power. The shunt regulator also has a field effect transistor (FET) shunt for each phase of the multiphase PMA.

The shunt regulator has a controller capable of controlling the FET shunts. Each of the FET shunts can redirect power to neutral when a control input is received. Additionally, each FET shunt has a logical OR gate connected to its control input which is capable of turning on the FET shunt when a control signal from the controller indicates that the FET shunt should be on or when the phase voltage connected to the FET shunt is negative. Each logical OR gate accepts inputs from the controller and from a comparator.

These and other features of the present invention can be best understood from the following specification and drawings, the following of which is a brief description.

DETAILED DESCRIPTION OF THE PREFERRED EMBODIMENT

Figure 1:
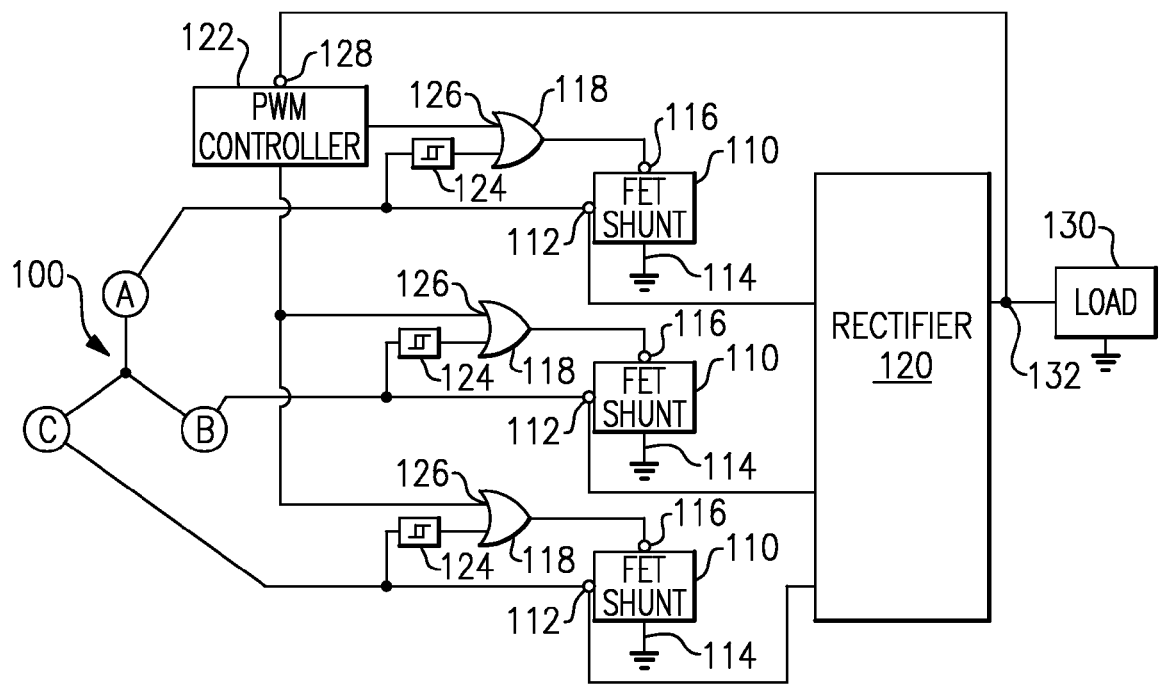
FIG. 1 illustrates an example shunt regulator connected to a three phase AC power source and a DC load.

FIG. 1 illustrates an example FET shunt regulator where the FET shunts 110 are controlled to prevent return current from passing through the FET shunt and thereby dissipating power in the body drain diode mode of an FET. The example of FIG. 1 illustrates a three phase power source 100 (such as a permanent magnet alternator, PMA) having phases A, B, and C. Each phase of the PMA 100 is connected to a drain node 112 of an FET shunt 110 and to a DC rectifier 120 which is capable of rectifying AC power and outputting DC power to a DC load 130. The FET shunts 110 each have a FET control input node 116. A source node 114 of the FET shunt 110 is connected to a neutral line.

The FET shunt control input node 116 is connected to the output of a logical OR gate 118. The logical OR gate 118 accepts two control signal inputs and, whenever either of the control signal inputs indicates that the FET shunt 110 should be turned on, the logical OR gate 118 outputs a control signal turning the FET shunt 110 on. The logical OR gate accepts a pulse width modulated (PWM) control signal input from a PWM controller 122. The PWM controller 122 is connected to a first logical OR gate 118 input 126 on each phase and outputs an identical signal to each FET shunt 110. The identical signals ensure that whenever the PWM controller 122 indicates that the FET shunts 110 should be turned on, each FET shunt 110 is activated simultaneously.

Additionally connected to each logical OR gate 118 is a comparator 124 output. The comparator 124 has an input which is connected to the corresponding phase of the AC power source 100, and varies its output based on whether the phase voltage is positive or negative.

The pulse width modulation controller 122 of FIG. 1 additionally has a feedback input 128. The feedback input 128 accepts a measurement of the DC rectifier output voltage 132 and allows the PWM controller 122 to determine, based on the rectifier 120 output voltage, if the FET shunts 110 need to be utilized.

Figure 2:
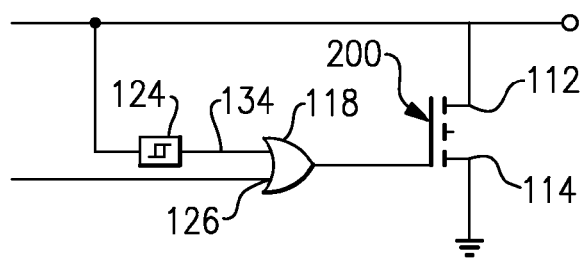
FIG. 2 illustrates example control circuitry for a single phase of a shunt regulator where the FET shunt utilizes one FET.

FIG. 2 illustrates an example FET shunt 110 for one phase using a single FET 200. In the example of FIGS. 1 and 2 the comparator 124 is capable of examining the AC phase input and determining if the AC phase input voltage is positive or negative. If the AC phase voltage is negative the comparator 124 outputs a control signal indicating that the FET shunt 110 should be turned on. In this way the FET shunt 110 will be activated on each phase whenever the AC phase voltage is negative or there is a PWM control signal turning the FET shunt 110 on.

In the example of FIG. 2 a reverse current flow across a body drain diode of an FET 200 causes a certain amount of power dissipation depending on the specific type and design of the FET 200. Most standard FET's have a body-drain diode drop of about 1.4V (for example) as current is traveling across them. A source-drain voltage drop (as would occur if the FET 200 were turned on) is significantly lower than 1.4V and consequently does not dissipate as much power. By activating the FET 200 when there is a reverse current, the system returns power to the AC power source 100 through a source-drain connection on the FET 200 instead of through the body-drain diode connection of the FET 200. This allows the system to see a significant increase in efficiency as well as increasing the life-span of the FET 200.

In normal operation, a design similar to FIG. 1 using a three phase PMA 100 and where the PWM control signal is connected directly to an FET shunt 110 at input node 116, a shunting operation will be performed in order to maintain an adequate DC out power at node 132. By way of example, if the DC load can only handle two amps of DC current, and the DC rectifier 120 would output three amps of DC current if it converted all of the AC power from the PMA 100, one amp of the current needs to be directed elsewhere. The PWM controller 122 solves this by turning the FET shunts 110 on for ⅓ of the time and off for ⅔ of the time at a high enough frequency to have the DC rectifier output a steady 2 amps of DC current.

The switching on and off of the FET shunt results in two current flow paths. While the FET shunts 110 are turned off (i.e. there is no source-drain current flow in the FET 200) current will flow from at least one of the phases to the rectifier 120, and from the rectifier 120 to the remainder of the phases. The current flow traveling from the rectifier 120 to the phases is then returned to the PMA 100. When this occurs while the FET shunts 110 are turned off the current must travel through a body-drain region of the FET 200 which operates as a body-drain diode. When current travels through an FET operating in body-drain diode mode the current flow encounters a voltage drop thereby dissipating a portion of the power that could be returned to the PMA.

While the FET shunts 110 are turned on by the PWM controller 122, the current will still need a return path to the PMA 100, however, since the FET 200 is turned on the current can travel through a source-drain connection of the FET 200. The source-drain connection of the FET 200 allows the return current to flow virtually unimpeded resulting in a significant increase in efficiency while the FET shunts 110 are on.

In order to realize the same efficiency gain while the FET shunts 110 are turned off the logical OR gate 118 is added. The logical OR gate 118 turns on the FET shunt 100 whenever it receives a signal from the PWM controller 122. Additionally, since a logical OR will have an output whenever either or both of the inputs 126, 134 have a signal indicating that the FET shunt 110 should be turned on, whenever the comparator 124 outputs a FET shunt control signal, the FET shunt 110 will be turned on.

The comparator 124 can be any stock comparator which is capable of outputting a signal whenever the phase voltage is negative, and not outputting a signal whenever the phase voltage is positive. Since a phase will have a return current on it whenever the phase voltage is negative, the comparator will turn on the FET shunt whenever there is a return current on the corresponding phase. The shunt regulator can then realize the efficiency which it has during shunting, for its return current path when it is not shunting without sacrificing performance.

It is known that the above disclosed system could be modified to operate with any number of phases and still fall within this disclosure.

Although an example embodiment has been disclosed, a worker of ordinary skill in this art would recognize that certain modifications would come within the scope of this disclosure. For that reason, the following claims should be studied to determine the true scope and content of this invention.

What is claimed is:

1. An electrical system comprising;
   a multiphase permanent magnet alternator (PMA);
   a rectifier;
   a controller;
   a plurality of field effect transistor (FET) shunts equal to the number of electrical phases of said PMA;
   a plurality of logical OR gates;
   a plurality of comparators;
   wherein each of said FET shunts corresponds to a phase of said PMA and is connected in such a way as to allow power to travel unimpeded between said PMA and said rectifier when said FET shunt is off and redirect current from said PMA to neutral when said FET shunt is on;
   wherein each of said FET shunts receives a control signal from a corresponding logical OR gate;
   wherein each of said logical OR gates comprises a control signal input and a comparator input;
   wherein each of said logical OR gates is capable of outputting a control signal turning said corresponding FET shunt on whenever either the corresponding comparator or the controller indicates that the FET shunt should be turned on.

2. The electrical system of claim 1 wherein each said logical OR gates corresponds to a phase of said PMA and wherein a comparator connected to said logical OR gate corresponds to the same phase of said PMA.

3. The electrical system of claim 1 wherein each of said comparator's is capable of outputting a control signal indicating that a corresponding FET shunt is to be turned on.

4. The electrical system of claim 1 wherein each of said plurality of FET shunts comprises at least one FET.

5. The electrical system of claim 1 wherein said controller is capable of receiving a feedback signal indicating a DC power output voltage of said rectifier.

6. The electrical system of claim 5 wherein said controller is capable of controlling said DC power output voltage through said rectifiers.

7. The device of claim 1 wherein said logical OR gate and said comparator prevent said FET shunts from operating in a body-drain diode mode.

8. A current controlled shunt regulator comprising;
   a rectifier;
   a controller;
   a plurality of field effect transistor (FET) shunts equal to the number of electrical phases of an electrical system;
   a plurality of logical OR gates;
   a plurality of comparators;
   wherein each of said FET shunts corresponds to a phase of an electrical system and is connected in such a way as to allow power to travel unimpeded between said corresponding phase of said electrical system and said rectifier when said FET shunt is off and redirect current from said corresponding phase of said electrical system to neutral when said FET shunt is on;
   wherein each of said FET shunts receives a control signal from a corresponding logical OR gate;
   wherein each of said logical OR gates comprises a control signal input and a comparator input; and
   wherein each of said logical OR gates is capable of outputting a control signal turning said corresponding FET shunt on whenever either a corresponding comparator or the controller indicates that the FET shunt should be turned on.

9. The device of claim 8 wherein each of said logical OR gates corresponds to a phase of said electrical system and wherein a comparator connected to said logical OR gate corresponds to the same phase of said electrical system.

10. The device of claim 8 wherein each of said comparator's is capable of outputting a control signal indicating that a corresponding FET shunt is to be turned on.

11. The device of claim 8 wherein said electrical system comprises a permanent magnet alternator capable of producing multiphase AC power.

12. The electrical system of claim 8 wherein each of said plurality of FET shunts comprises at least one FET.

13. The electrical system of claim 8 wherein said controller is capable of receiving a feedback signal indicating a DC power output voltage of said rectifier.

14. The electrical system of claim 8 wherein said controller is capable of controlling a DC power output voltage through said rectifiers.

15. The device of claim 8 wherein said logical OR gate and said comparator prevent said FET shunts from operating in a body-drain diode mode.

16. The electrical system of claim 1, wherein said comparator is capable of comparing an AC phase input with a pre-defined value, thereby determining if said AC phase input is positive or negative.

17. The electrical system of claim 16, wherein said comparator indicates that the FET shunt should be turned on in response to said comparator determining that said AC phase input is negative.

18. The electrical system of claim 8, wherein said comparator is capable of comparing an AC phase input with a pre-defined value, thereby determining if said AC phase input is positive or negative.

19. The electrical system of claim 18, wherein said comparator indicates that the FET shunt should be turned on in response to said comparator determining that said AC phase input is negative.

* * * * *

UNITED STATES PATENT AND TRADEMARK OFFICE
CERTIFICATE OF CORRECTION

| | | |
|---|---|---|
| PATENT NO. | : 7,848,123 B2 | Page 1 of 1 |
| APPLICATION NO. | : 12/348611 | |
| DATED | : December 7, 2010 | |
| INVENTOR(S) | : Gary L. Hess | |

It is certified that error appears in the above-identified patent and that said Letters Patent is hereby corrected as shown below:

ON THE TITLE PAGE:

The Assignee should read as follows:

(73)    Assignee: Hamilton Sundstrand Corporation, Windsor Locks, CT (US)

Signed and Sealed this

First Day of March, 2011

David J. Kappos
*Director of the United States Patent and Trademark Office*